UNITED STATES PATENT OFFICE.

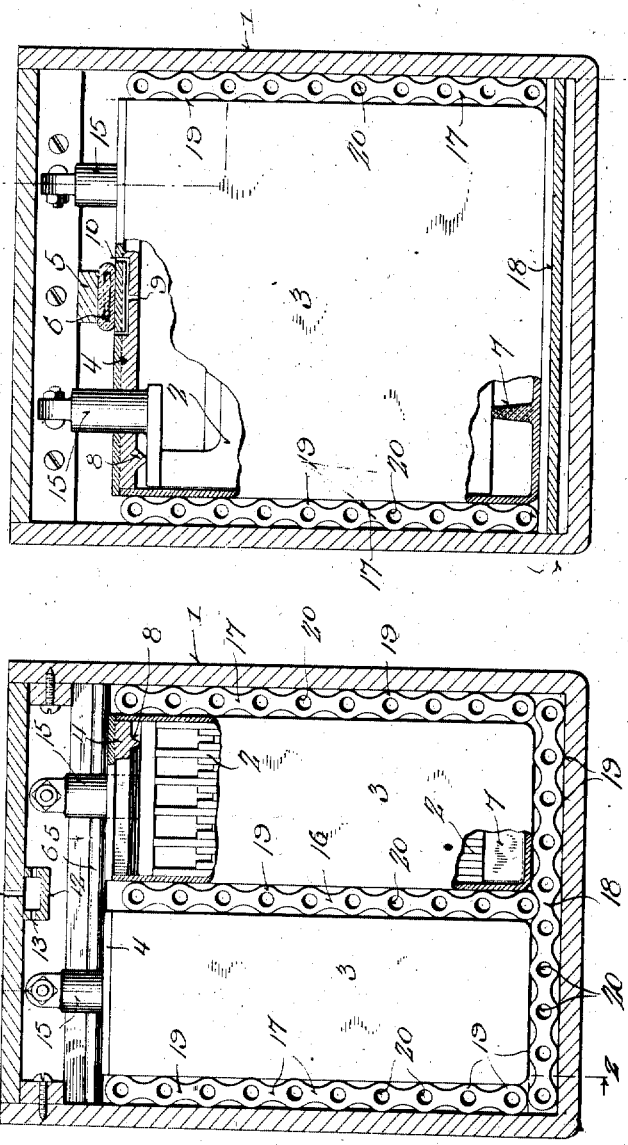

FREDERICK N. BOSSON, OF CALUMET, MICHIGAN, AND LYSANDER B. ARMSTRONG, OF MILWAUKEE, WISCONSIN.

SHOCK-ABSORBER FOR BATTERIES.

1,235,648.  Specification of Letters Patent.  Patented Aug. 7, 1917.

Application filed August 20, 1915. Serial No. 46,577.

*To all whom it may concern:*

Be it known that we, FREDERICK N. BOSSON and LYSANDER B. ARMSTRONG, both citizens of the United States, and residents of Calumet, in the county of Houghton and State of Michigan, and of Milwaukee, in the county of Milwaukee and State of Wisconsin, respectively, have invented certain new and useful Improvements in Shock-Absorbers for Batteries; and we do hereby declare that the following is a full, clear, and exact description thereof.

This invention relates to the subject of storage and other batteries, and the primary aim of the invention is to provide a novel type of battery jar for the electrodes that will cushion said electrodes against damage due to vibrations transmitted to the battery case, the jar being formed of cushioning material that will yieldably engage the electrodes. Another object of the invention is to provide novel means for cushioning two or more of the battery jars from each other and also to provide means for cushioning the jars from the battery case.

A simple and thoroughly practical embodiment of the invention is shown in the accompanying drawing, wherein—

Figure 1 is a vertical sectional view of a battery provided with the improved cushioning or shock absorbing means, the section being taken on the line 1—1, Fig. 2.

Fig. 2 is a similar view taken on the line 2—2, Fig. 1.

Referring to the accompanying drawings by numerals, 1 designates the battery case having the sets of electrodes 2 therein, the electrodes being inclosed by the jars 3 provided with the covers 4 that are held in position to close the jars by the clamping bar 5 depending from the cover of the case and having a cushion 6 of soft material such as rubber that bears on the covers 4. The jars 3 are preferably formed of comparatively stiff material such as rubber that is hardened, and the side portions or walls of the jars abut the electrodes 2. The bottoms of the jars may be provided with a rib or ribs 7 of soft rubber, the ribs projecting inwardly and engaging the bottom edges of the electrodes 2. The jar covers 4 are preferably formed of soft rubber having a hard rubber backing vulcanized thereto, the covers being also provided with inwardly projecting soft rubber ribs 8 that bear on the hangers for the electrodes. The covers 4 are provided with a central vent opening 9 having branches 10 that extend through the backing. The case 1 is provided with a central opening 11 for venting purposes, the inlet end of said opening being surrounded by a cage 12 having side inlets 13. The covers 4 are also provided with suitable openings 14 through which the electrode hangers 15 project.

As is shown more clearly in Fig. 1 of the drawings, the jars 3 have a shock absorbing sheet 16 interposed between them, and similar strips or sheets 17 are interposed between the jars and the sides and ends of the case 1. And the jars 3 seat on a bottom sheet of shock absorbing material 18. The shock-absorbing sheets 16, 17 and 18 are preferably of the same shape and material, each having their outer surfaces transversely corrugated, as indicated at 19 and having the transverse openings 20 extending through the sheets, the opening corresponding in number with the corrugations. The shock absorbing sheets are preferably of soft rubber and being of cellular formation it will be readily apparent that they will effectively shield the jars from vibratory and other shocks that may be transmitted to the case 1.

The shock absorbing arrangement for batteries is of special utility in connection with motor and other vehicles wherein the batteries are subjected to shocks and jars incidental to the travel of the vehicle and the running of the engine.

What we claim as our invention is:—

1. A storage or other battery comprising a case, electrode jars in the case, resilient cushioning means disposed between the jars and the case, ledges on the upper wall portion of the case, a bar having its ends adapted to fit under said ledges and a cushion carried by the bar and engageable with the electrode jars.

2. A storage battery or other battery comprising a case, electrode jars in the case, electrodes in the jars rigid cover plates for the electrode jars, cushions carried by said covers and engageable with the electrodes, and means for holding said covers on the jars to urge the cushion thereof against the electrodes.

In testimony that we claim the foregoing we have hereunto set our hands at Calumet in the county of Houghton and State of Michigan, and at Milwaukee, in the county of Milwaukee, and State of Wisconsin, respectively, in the presence of two witnesses.

FREDK. N. BOSSON.
LYSANDER B. ARMSTRONG.

Witnesses:
GEO. W. YOUNG,
M. E. DOWNEY.